(12) United States Patent
Cockings et al.

(10) Patent No.: US 11,260,812 B2
(45) Date of Patent: Mar. 1, 2022

(54) APPARATUS AND METHOD FOR ENABLING STORING OF A USER INPUT VEHICLE SETTING

(71) Applicant: JAGUAR LAND ROVER LIMITED, Coventry (GB)

(72) Inventors: Kevin Cockings, Warwickshire (GB); Aaron Whitehead, Warwickshire (GB); Michael Decock, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 75 days.

(21) Appl. No.: 16/491,961

(22) PCT Filed: Feb. 2, 2018

(86) PCT No.: PCT/EP2018/052630
§ 371 (c)(1),
(2) Date: Sep. 6, 2019

(87) PCT Pub. No.: WO2018/162155
PCT Pub. Date: Sep. 13, 2018

(65) Prior Publication Data
US 2020/0070758 A1  Mar. 5, 2020

(30) Foreign Application Priority Data
Mar. 7, 2017 (GB) ...................... 1703591

(51) Int. Cl.
*B60R 16/037* (2006.01)
*B60R 25/20* (2013.01)

(52) U.S. Cl.
CPC ........ *B60R 16/037* (2013.01); *B60R 25/2081* (2013.01); *B60R 2325/101* (2013.01); *B60R 2325/105* (2013.01)

(58) Field of Classification Search
CPC .............. B60R 16/037; B60R 25/2081; B60R 2325/101; B60R 2325/105; B60R 25/241
(Continued)

(56) References Cited

U.S. PATENT DOCUMENTS 5,525,977 A * 6/1996 Suman .................... B60R 25/00
340/4.4
5,886,634 A * 3/1999 Muhme .............. G08B 13/2482
340/572.1
(Continued)

FOREIGN PATENT DOCUMENTS

DE         10026382 A1    11/2001
DE     102004059692 A1     6/2006
(Continued)

OTHER PUBLICATIONS

Search and Examination Report, GB1703591.6, dated Sep. 6, 2017, 7 pages.
(Continued)

*Primary Examiner* — Edwin C Holloway, III
(74) *Attorney, Agent, or Firm* — McCoy Russell LLP

(57) ABSTRACT

An apparatus (101) for enabling storing of settings of a vehicle (201), a system, a vehicle (201), a method (300, 400, 500, 600), a computer program (105) and a non-transitory computer-readable storage medium (108) are disclosed. The apparatus (101) comprises a processing means and a memory means for storing at least one setting of the vehicle (201) for at least one user. The apparatus (101) is configured to determine that access into a vehicle (201) has been granted in dependence on a first primary identifier having been received from a first primary electronic device (218A) and determine that a first secondary identifier corresponding to a first user of the vehicle (201) has been received from a first secondary electronic device (221). The apparatus (101) is also configured to, in dependence on determining that the (Continued)

first secondary identifier has been received from the first secondary electronic device (221) and that access into the vehicle has been granted in dependence on the first primary identifier having been received from the first primary electronic device (218A), enable storing of a setting of the vehicle (201) for the first user.

17 Claims, 7 Drawing Sheets

(58) Field of Classification Search
USPC .................................. 701/49; 340/5.24, 5.72
See application file for complete search history.

(56) References Cited

U.S. PATENT DOCUMENTS

| | | | | |
|---|---|---|---|---|
| 6,198,996 | B1* | 3/2001 | Berstis | H04L 63/105 |
| | | | | 701/36 |
| 2002/0118579 | A1* | 8/2002 | Lucy | B60N 2/0248 |
| | | | | 365/200 |
| 2005/0225429 | A1* | 10/2005 | Burzio | B60R 25/04 |
| | | | | 340/5.24 |
| 2008/0269961 | A1 | 10/2008 | Shitanaka et al. | |
| 2013/0289800 | A1 | 10/2013 | Gautama et al. | |
| 2014/0091903 | A1* | 4/2014 | Birkel | B60R 25/241 |
| | | | | 340/5.54 |
| 2014/0310379 | A1 | 10/2014 | Ricci et al. | |
| 2015/0120151 | A1 | 4/2015 | Akay et al. | |
| 2017/0369071 | A1* | 12/2017 | Gould | B60R 25/24 |

FOREIGN PATENT DOCUMENTS

| | | |
|---|---|---|
| DE | 102014222426 A1 | 5/2016 |
| EP | 0957016 A1 | 11/1999 |
| GB | 2528086 A1 | 1/2016 |
| WO | 2010045554 A1 | 4/2010 |
| WO | 2013101054 A1 | 12/2011 |
| WO | 2015077662 A1 | 5/2015 |

OTHER PUBLICATIONS

International Search Report and Written Opinion, PCT/EP2018/052630, dated May 11, 2018, 14 pages.

* cited by examiner

APPARATUS AND METHOD FOR ENABLING STORING OF A USER INPUT VEHICLE SETTING

CROSS-REFERENCE TO RELATED APPLICATIONS

This application is a 371 of International Application No. PCT/EP2018/052630, filed Feb. 2, 2018, which claims priority to GB Patent Application 1703591.6, filed Mar. 7, 2017, the contents of both of which are incorporated by reference herein in their entirety.

TECHNICAL FIELD

The present disclosure relates to an apparatus and a method for enabling storing of settings of a vehicle. In particular, but not exclusively it relates to an apparatus and a method for enabling storing of settings of a road vehicle.

Aspects of the invention relate to an apparatus, a system, a vehicle, a method, a computer program and a non-transitory computer-readable storage medium.

BACKGROUND

Systems have previously been produced to automatically adjust settings of a vehicle to settings previously selected by a user. In such systems each driver of the vehicle is required to have their own transponder key with a unique identifier that effectively identifies the driver to the system. When a driver of the vehicle uses their key, adjustments that the user has made to settings of various properties of the vehicle are stored. On the next occasion that the driver uses their key, the properties of the vehicle are automatically returned to the stored settings. A problem with this arrangement is that if the owner of a key lends the key to another person, and that person makes adjustments to the settings of the vehicle, the new settings are automatically stored and the owner of the key loses their settings.

It is an aim of the present invention to address disadvantages of the prior art.

SUMMARY OF THE INVENTION

Aspects and embodiments of the invention provide an apparatus, a system, a vehicle and a method as claimed in the appended claims.

According to an aspect of the invention there is provided an apparatus for enabling storing a user input vehicle setting, the apparatus comprising a processor and a memory for storing at least one user input vehicle setting, wherein the apparatus is configured to: determine access into a vehicle has been granted in dependence on receipt of a primary identifier from a primary electronic device; determine the identity of a user in dependence on receipt of a secondary identifier from a secondary electronic device; and enable storing in the memory the user input vehicle setting associated with the determined identity of the user.

This provides the advantage that, when a first user lends their first primary electronic device, such as a key for unlocking a vehicle, to a second user of the vehicle, a change made to a setting of the vehicle by the second user is prevented from being stored if the first secondary device is not present at the vehicle. Therefore the first user is able to lend the vehicle without being concerned that the first user's vehicle settings will be lost.

In an example, the apparatus is configured to: store data to register the primary electronic device as being associated to the secondary electronic device and/or the identity of the user; and enable the storing of the user input vehicle setting only when the secondary identifier is received from the secondary device that is registered as being associated to the primary electronic device.

In an example, the apparatus is configured to provide an output signal for causing a change in a vehicle setting of a property of the vehicle, and the output signal is provided in response to said determining that access into the vehicle has been granted.

This provides the advantage that the property may be set when access to the vehicle has been granted.

In an example, the output signal is provided regardless of whether the secondary identifier has been received.

This provides the advantage that the property may be set even when the first secondary electronic device is not present or before the first secondary identifier has been received. In the latter case, this may provide more time for any changes to the setting of a property of the vehicle to be made, enhancing the overall user experience.

In an example, the apparatus is configured to: determine that, in dependence on a second primary identifier having been received from a second primary electronic device, access into the vehicle has been granted; determine the identity of a second user in dependence on receipt of a second secondary identifier from a second secondary electronic device; and enable storing a user input vehicle setting associated with the second user in the memory.

This provides the advantage that a second user is able to store a setting when they access the vehicle with the second primary electronic device, such as their key, and they are in possession of the second secondary electronic device, such as their mobile phone, which is arranged to transmit the second secondary identifier.

In an example, the apparatus is configured to: store the secondary identifier associating the secondary electronic device to the user; store a third identifier associating a third electronic device to the user; and enable storing of a user input vehicle setting in the memory for said user in dependence on determining that the secondary identifier has been received from the secondary electronic device or determining that the third identifier has been received from the third electronic device.

This provides the advantage that either one of two different devices may be used to determine the identity of the user when used in conjunction with a primary electronic device, enabling storing of a setting by the first user.

In an example, wherein the user input vehicle setting comprises one of: a seat position; a mirror position; an HVAC setting; a driving aid setting; an entertainment or infotainment system setting; a suspension setting; a brake setting; a powertrain setting.

In an example, the apparatus is configured to: receive an override signal; and on receipt of receiving an override signal, prevent storing of any user input vehicle in the memory.

This provides the advantage that a second user of the vehicle may, for example, drive the vehicle and adjust a setting such as a seat position without it being stored, even when a secondary device is present and transmits a secondary identifier.

In an example, the apparatus is configured to: in dependence on the primary identifier being received from the primary electronic device; retrieve stored information from the memory identifying the secondary electronic device; and perform a scan for the secondary electronic device.

In an example, the apparatus is configured to: enable the storing of user input vehicle setting in dependence on a determination that the vehicle has been locked from outside of the vehicle.

In an example, the apparatus, and a radio signal receiver configured to: receive a radio signal comprising the primary identifier from the primary electronic device and/or receive a radio signal comprising the secondary identifier from the secondary electronic device; and provide a corresponding indication to the apparatus in response to receiving the primary identifier or the secondary identifier.

In an example, the radio signal receiver comprises at least one of: a Bluetooth® transceiver; a wireless local area network (wireless LAN) transceiver; a radio frequency identification (RFID) reader.

In another aspect, there is provided a system comprising the apparatus of any preceding paragraph, wherein the system comprises a primary electronic device and wherein the primary electronic device comprises a portable key configured to communicate with the radio signal receiver.

In an example, the system comprises the secondary electronic device, which is configured to perform at least one function independently from the vehicle. Optionally, at least one of the functions comprises transmitting and/or receiving signals via a telecommunications network.

According to a further aspect of the invention there is provided an apparatus for enabling storing of settings of a vehicle, the apparatus comprising a processing means and a memory means for storing at least one setting of the vehicle for at least one user, wherein the apparatus is configured to: determine that access into a vehicle has been granted in dependence on a first primary identifier having been received from a first primary electronic device; determine that a first secondary identifier corresponding to a first user of the vehicle has been received from a first secondary electronic device; and in dependence on determining that the first secondary identifier has been received from the first secondary electronic device and that access into the vehicle has been granted in dependence on the first primary identifier having been received from the first primary electronic device, enable storing of a setting of the vehicle for the first user.

According to another aspect of the invention there is provided an apparatus for enabling storing of settings of a vehicle, the apparatus comprising at least one electronic processor and at least one electronic memory device for storing at least one setting of the vehicle for at least one user and program instructions executable by the processor, wherein the at least one electronic processor is configured to: determine that access into a vehicle has been granted in dependence on a primary identifier having been received from a primary electronic device; determine that a secondary identifier corresponding to a first user of the vehicle has been received from a secondary electronic device; and in dependence on determining that the secondary identifier has been received from the secondary electronic device and that access into the vehicle has been granted in dependence on the primary identifier having been received from the primary electronic device, enable storing of a setting of the vehicle for the first user.

In some embodiments the apparatus is configured to: store data to register the first primary electronic device as being associated to the first secondary electronic device and/or the first user; and enable the storing of the setting only when the first secondary identifier is received from the first secondary device that is registered as being associated to the first primary electronic device.

In some embodiments the apparatus is configured to: determine that, in dependence on a second primary identifier having been received from a second primary electronic device, access into the vehicle has been granted; and in dependence on determining that a second secondary identifier corresponding to a second user of the vehicle has been received from a second secondary electronic device, enable storing of a setting of the vehicle that is associated with the second secondary electronic device.

In some embodiments the apparatus is configured to: store a first secondary identifier associating the first secondary electronic device to the first user; store a third secondary identifier associating a third secondary electronic device to the first user; and enable storing of a setting of the vehicle for said first user in dependence on determining that the first secondary identifier has been received from the first secondary electronic device or determining that the third secondary identifier has been received from the third secondary electronic device.

In a further aspect, there is provided a vehicle comprising the apparatus or system of any of the preceding paragraphs.

In yet a further aspect, there is provided a method of enabling storing a user input vehicle setting, the method comprising: determining that access into a vehicle has been granted in dependence on a receipt of a primary identifier from a primary electronic device; determining that a secondary identifier has been received from a secondary electronic device; determining a user identity, in dependence on the secondary identifier; determining that a user input vehicle setting has been received; and enable storing of said user input vehicle setting associated with said user identity.

This provides the advantage that, when a first user lends their primary electronic device, such as a key for unlocking a vehicle, to a second user of the vehicle, a change made to a setting of the vehicle by the second user is prevented from being stored if the secondary device is not present at the vehicle.

In an example, the method comprises: storing data to register the secondary electronic device as being associated to the first primary electronic device; and enabling the storing of the user input vehicle setting only when the secondary identifier is received from the secondary device registered as being associated to the primary electronic device.

In an example, the method comprises providing an output signal for causing a change in a vehicle setting, wherein the output signal is provided in response to said determining that access into the vehicle has been granted.

In an example, the output signal is provided regardless of whether the secondary identifier has been received.

In an example, the method comprises: determining that, in dependence on a primary identifier having been received from a second primary electronic device, access into the vehicle has been granted; and in dependence on determining that a secondary identifier has been received from a secondary electronic device and that secondary electronic device is associated to the identity of a second user of the vehicle, storing said user input vehicle setting and associating those user input vehicle settings with the identity of the second user.

In an example, the method comprises: storing a first secondary identifier associating a first secondary electronic device to a user; storing a third identifier associating a third electronic device to the user; and enabling storing of a user input vehicle setting for the user in dependence on determining that the first secondary identifier has been received from the first secondary electronic device or determining that the third identifier has been received from the third electronic device.

In an example, the setting of the vehicle comprises one of: a seat position; a mirror position; an HVAC setting; an entertainment or infotainment system setting; a driving aid setting; a suspension setting; a brake setting; a throttle setting.

In an example, the method comprises receiving a radio signal comprising the primary identifier from the primary electronic device and/or receiving a radio signal comprising the secondary identifier from the secondary electronic device. Optionally, the at least one radio signal is received by at least one of: a Bluetooth® transceiver; a wireless local area network (wireless LAN) transceiver; a radio frequency identification (RFID) reader. Optionally, the method comprises receiving the radio signal from a portable key.

In an example, the secondary electronic device is configured to perform functions independently from the vehicle.

In still a further aspect, there is provided a method of enabling storing of user-settings of a vehicle, the method comprising: determining that access into a vehicle has been granted in dependence on a first primary identifier having been received from a first primary electronic device; determining that a first secondary identifier corresponding to a first user of the vehicle has been received from a first secondary electronic device; and enabling storing of a setting for the vehicle in dependence on said determining that the first secondary identifier has been received from the first secondary electronic device and that access into the vehicle has been granted in dependence on the first primary identifier having been received from the first primary electronic device.

In some embodiments the method comprises: storing data to register the first secondary electronic device, as being associated to the first primary electronic device; and enabling the storing of the setting only when the first secondary identifier is received from the first secondary device that is registered as being associated to the first primary electronic device.

In some embodiments the method comprises: determining that, in dependence on a second primary identifier having been received from a second primary electronic device, access into the vehicle has been granted; and in dependence on determining that a second secondary identifier corresponding to a second user of the vehicle has been received from a second secondary electronic device, enabling storing of a setting of the vehicle for said second user.

In some embodiments the method comprises: receiving an override signal; and on receipt of receiving an override signal, preventing storing of any settings of the vehicle.

In some embodiments at least one of the functions comprises transmitting and/or receiving signals via a telecommunications network.

According to another aspect of the invention there is provided a computer program which when executed on a processor causes the processor to perform the method of any one of the previous paragraphs.

According to yet another aspect of the invention there is provided a non-transitory computer-readable storage medium having instructions stored therein which when executed on a processor cause the processor to perform the method of any one of the previous paragraphs.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The Figures illustrate an apparatus 101 for enabling storing of user input vehicle settings for a vehicle 201, the apparatus 101 comprising a processing means and a memory means for storing one or more user input vehicle setting, wherein the apparatus 101 is configured to: determine that access into a vehicle 201 has been granted in dependence on a first primary identifier having been received from a first primary electronic device 218A, 218B; determine the identity of a first user in dependence on receipt of a first secondary identifier corresponding to the first user of the vehicle 201 has been received from a first secondary electronic device 221, 222, 223; and in dependence on determining that the first secondary identifier has been received from the first secondary electronic device 221, 222, 223 and that access into the vehicle 201 has been granted in dependence on the first primary identifier having been received from the first primary electronic device 218A, 218B, enable storing of a user input vehicle setting associated with the identity of the first user.

Figure 1:
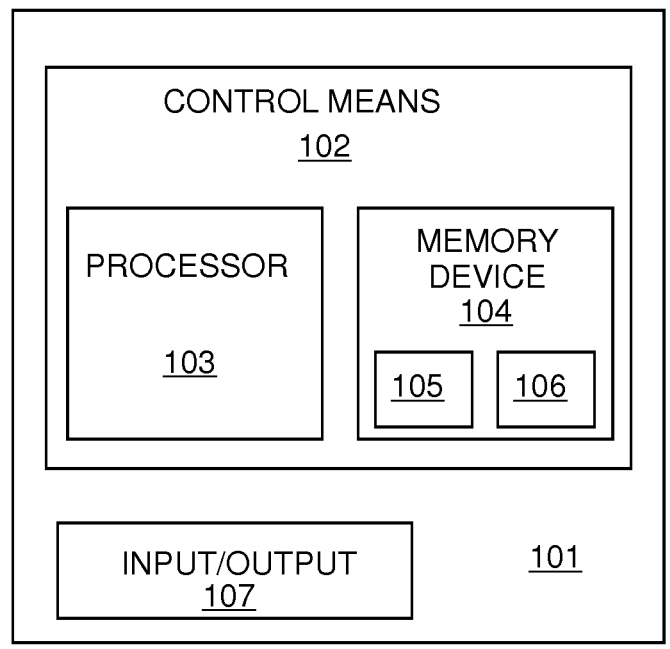
FIG. 1 shows a schematic diagram of an example of an apparatus 101 for enabling storing of settings of a vehicle.
Figure 1:
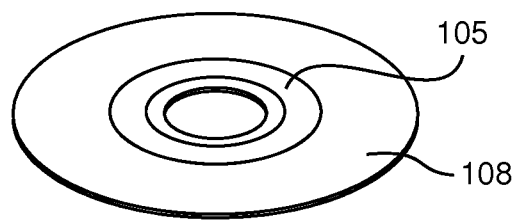

An example of an apparatus 101 for enabling storing of user input vehicle settings is shown in FIG. 1. The apparatus 101 comprises a control means 102 comprising a processing means 103 in the form of at least one electronic processor 103 and a memory means 104 in the form of at least one electronic memory device 104. The memory means 104 is arranged to store program instructions 105 that are executable on the processor 103 to cause it to perform the methods that will be described below. In addition, the memory means 104 is arranged to store at least one setting 106 of the vehicle (201 shown in FIG. 2) for at least one user.

The apparatus 101 also comprises input and output means 107 for enabling communication to, and from, the control means 102. The input and output means 107 may comprise one or more transceivers for enabling communication over a bus (such as buses 202 shown in FIG. 2) to enable communication to and from various electronic control units (ECUs) within the vehicle (201 shown in FIG. 2).

The computer program 105 stored on the memory device 104 may be transferred to the memory device 104 via a non-transitory computer readable medium, such as a CD-ROM 108 or a portable memory device or via a network, such as a wireless network.

Figure 2:
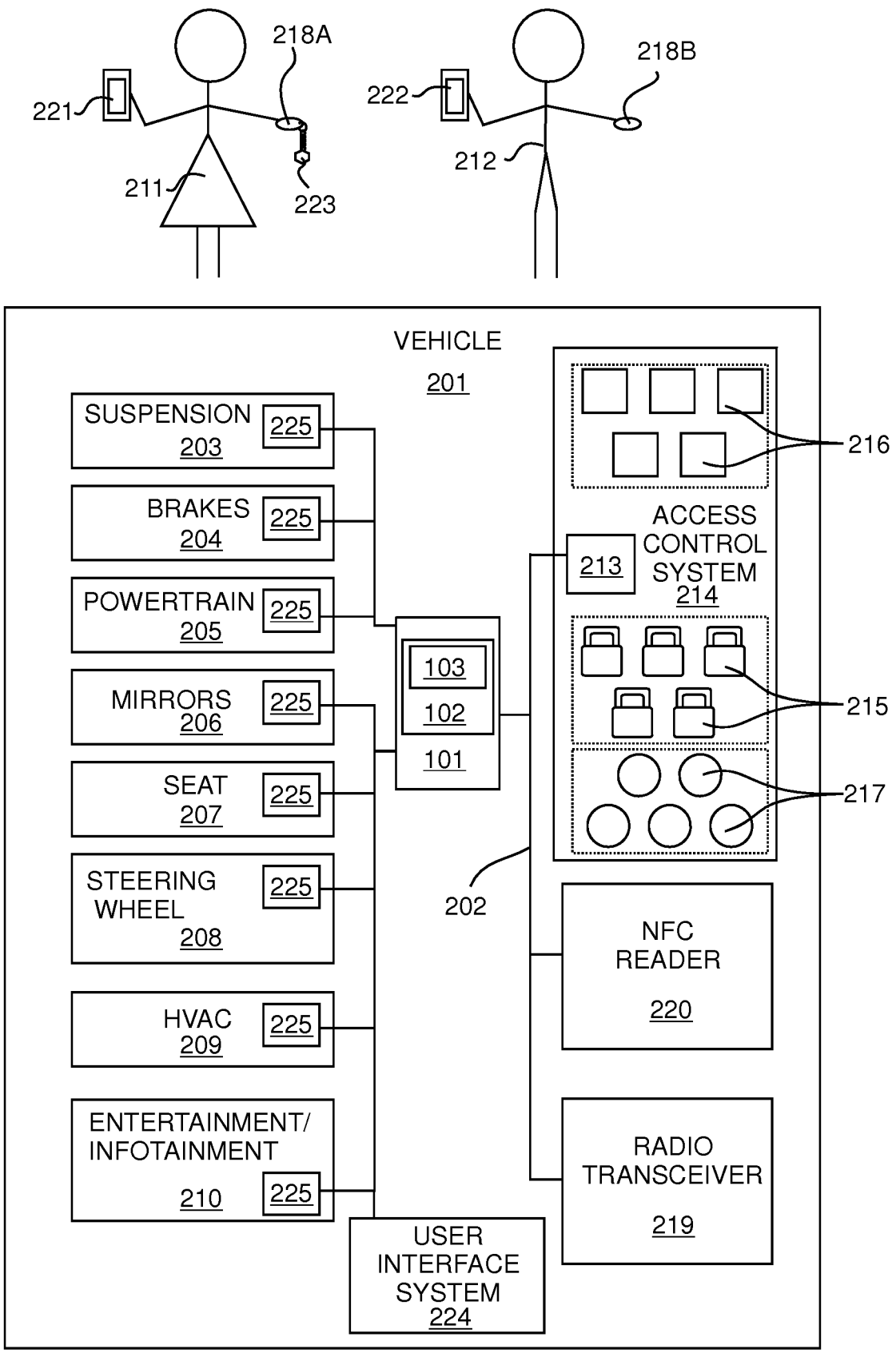
FIG. 2 shows a schematic diagram of the apparatus 101 located within a vehicle 201.

A schematic diagram of the apparatus 101 located within a vehicle 201 is shown in FIG. 2. In the present example, the apparatus 101 is connected to several system control means 225 via one or more buses 202. Thus, the apparatus 101 is capable of receiving information from the system control means 225 responsible for the control of various systems within the vehicle 201. The systems may include: a suspension system 203; a brakes system 204; a powertrain system 205; a mirror system 206; a seat system 207; a steering wheel system 208; a HVAC or heating, ventilation and air-conditioning system 209; and an entertainment or infotainment system 210. Other vehicle systems are useful, such as, by way of example, driving aid systems (not shown), which may take the form of adaptive cruise control systems, lane keeping assistance systems, auto-pilot systems, hill descent control systems, trailer towing aids, terrain based speed adaptation systems, interior camera systems, exterior camera systems and communication systems.

Each one of the systems 203 to 210 may have one or more settings that are adjustable by a user of the vehicle 201, such as drivers 211, 212 represented in FIG. 2. For example, when the first user 211 drives the vehicle 201 she may adjust the positions of the seats 207, mirrors 206 and steering wheel 208 to suit her, and when the second user 212 drives the vehicle 201 he may readjust the positions of the seats 207, mirrors 206 and steering wheel 208 to suit him. The systems 203 to 210 may be provided with suitable system control means 225, which may include an ECU (electronic control unit) and motors or other actuators for making the required adjustments. For example, the system control means 225 of the seat system 207 may comprise motors to enable automated movement of the driver's seat, to position the seat forwards and backwards, to raise, lower or to tilt the seat, and so on under the control of an ECU. Similarly, the system control means 225 of the mirror system 206 may comprise an ECU and motors to tilt each of the driver's mirrors about two axes to provide the driver with optimized views.

The system control means 225 are also configured to provide data to the apparatus 101 indicating a current setting of each property or system of the vehicle 201 that they control. Thus, for example, if a user 211, 212 adjusts the position of the driver's seat, the control means 225 of the seat system 207 is configured to provide the apparatus 101 with data indicating the new position of the driver's seat that has been selected by the user 211, 212.

The apparatus 101 is also configured to receive data from a controller 213 of an access control system 214 configured to control access into the vehicle 201. The access control system 214 includes door locks 215 for preventing unauthorized access into the vehicle 201 and sensing devices 216 to enable a user to unlock the door locks 215. The access control system 214 also includes handles or depressible buttons 217 to enable opening of doors (not shown) of the vehicle 201.

The sensing devices 216 may comprise radio transceivers or radio receivers for receiving radio signals transmitted by a primary electronic device, such as a key 218A or 218B, of the vehicle 201. In an example, keys 218A, 218B are remote keyless entry or RKE type keys (also known as remote electronic key fobs), as are known in the art. In response to receiving such a radio signal, a receiver or transceiver 216 may provide relevant data to the controller 213 which may then unlock or lock the door locks 215.

Alternatively, the sensing devices 216 may comprise a sensor configured to sense biometric information, such as a fingerprint, and the controller 213 may be configured to unlock the door locks 215 in response to a sensing device 216 receiving a valid input.

In an example, the access control system 214 is arranged to interact with key transponders of electronic key fobs, such as keys 218A and 218B. However, it will be appreciated that alternative electronic devices capable of receiving and transmitting signals comprising encoded data may be used to unlock a vehicle in a similar manner to a remote electronic key fob.

The access control system 214 also comprises door handles and/or buttons 217 to enable a user to open the doors (not shown) of the vehicle 201. Upon receiving a signal from a door handle or button 217 indicating that a person is attempting to open a door, the controller 213 of the access control system 214 is configured to scan for the presence of a primary electronic device, such as a key 218A, 218B, via transceivers 216 and if a valid signal is received it then unlocks the locks 215.

The controller 213 is configured to, on receipt of a valid signal from a sensing device 216 corresponding to a request to unlock the door locks 215, provide data to the apparatus 101 indicating that access to the vehicle 201 has been granted and indicating which of the primary electronic devices 218A and 218B was used to unlock the vehicle or which of the users 211, 212 provided the biometric input.

For the purposes of the present specification, the data received by the apparatus 101 indicating which primary electronic device, such as key 218A or 218B, was used to unlock the vehicle 201, or which of the users 211, 212 provided the biometric input used to access the vehicle, is referred to as a primary identifier. Also, a key 218A, 218B or sensor 216 that is configured to provide a primary identifier to unlock the vehicle 201 is referred to as a primary electronic device.

In response to receiving a primary identifier, the apparatus 101 is configured to retrieve data indicative of one or more settings stored in its memory means 104 (FIG. 1) that is associated with the respective primary electronic device 218A or 218B, or the respective user 211, 212 and provide the data to at least one of the systems 203 to 210. For example, the apparatus 101 may be configured to, on receipt of a first primary identifier from the first primary electronic device 218A, send data to the seat system 207 indicating a seat position for the first user 211, and in response the seat system 207 may then adjust the position of the driver's seat in readiness for the first user 211 entering the vehicle 201 and sitting in the driver's seat. Similarly, on receipt of a second primary identifier from the second primary electronic device 218B, the apparatus 101 may be configured to send data to the seat system 207 indicating a seat position for the second user 212, and in response the seat system 207 may then adjust the position of the driver's seat in readiness for the second user 212 entering the vehicle 201 and sitting in the driver's seat.

The apparatus 101 is also arranged to communicate via one or more other devices 219 and 220 with one or more other portable electronic devices, such as secondary electronic devices 221, 222 and/or third electronic devices 223 belonging to the users 211, 212. In the present example, the apparatus 101 is able to communicate with the first secondary device 221 belonging to the first user 211 and the second secondary device 222 belonging to the second user 212 via a radio transceiver 219. The secondary devices 221 and 222 may comprise electronic devices capable of communicating with the apparatus 101 via a short-range wireless network and the radio transceiver 219. For example, the radio transceiver 219 and the secondary devices 221 and 222 may be configured to communicate over a wireless local area network (WLAN) or by Bluetooth®.

The secondary devices 221 and 222 may comprise electronic devices, such as mobile phones (or cell phones), that are able to provide communications over a cellular telephone network (not shown).

In the present example, the apparatus 101 is also able to communicate with radio frequency identification devices (RFID devices), via a near field communication (NFC) reader 220. For example, the apparatus 101 is able to communicate with the third electronic device 223, which comprises an RFID device 223 carried by the first user 211. It will be appreciated that, for the purposes of the example shown and described herein, the third electronic device 223 may be considered as a third secondary device, as it too may be used to determine the identity and authority of the user and based on the signal received from this third secondary device, the apparatus 101 will determine whether user input vehicle settings are to be stored in the memory for later retrieval the next time that third secondary device 223 is in communication with the apparatus 101.

In alternative embodiments, the first and/or second secondary electronic devices 221, 222 are RFID devices, and/or the third secondary electronic device 223 is a capable of communicating with the apparatus 101 via a short-range wireless network, such as via a wireless local area network (WLAN) or by Bluetooth®. Short-range wireless networks using other telecommunication protocols are useful.

The apparatus 101 is configured to, in dependence on receiving a primary identifier, scan for one or more secondary identifiers that may be provided by one or more different secondary electronic devices associated with the received primary identifier. For example, a secondary identifier may be provided by one or more of the secondary electronic devices 221, 222 and 223 via the radio transceiver 219 or NFC reader 220. The secondary identifier may be used by the apparatus 101 to determine the identity of the user, either by association with the primary identifier, or by means of a separate teaching function, where the user first unlocks the vehicle using the primary electronic device 218A, 218B, and then accesses a teaching mode of the apparatus 101 and confirms that the secondary electronic device in electronic communication with the apparatus is the secondary electronic device that should be used as a user identifier by association with the user. Once this association between the recognized secondary electronic device and the user is stored in the memory, any user input vehicle settings made during a journey will be stored in the memory in a file associated with the user, and those settings may be quickly retrieved and applied by the apparatus 101 when the vehicle is unlocked and the identity of the user is determined upon detection of a recognized secondary identifier received from a recognized secondary electronic device.

For example, if the apparatus 101 receives a primary identifier that was transmitted by the second primary electronic device 218B, it may access its memory 104 to determine if details of any other devices have been stored that are associated with the second primary electronic device 218B, and in this way determine that the second secondary electronic device 222 is associated with the second primary electronic device 218B. The apparatus 101 may then scan for the presence of the second secondary electronic device 222, for example by determining which Bluetooth® enabled devices are within range and determining if the second secondary device 222 is one of them. The apparatus 101 may then be configured to enable storing of one or more settings of the vehicle 201 for the second user 212 in dependence on determining that the secondary identifier has been received from the second secondary device 222 that is associated with the primary identifier received from the second primary electronic device 218B. For example, if apparatus 101 receives data from the seat system 207 indicating that the second user 212 has moved his seat further back to a new position, the apparatus 101 is configured to store the data indicating the new seat position, in dependence on it having received the primary identifier from the second primary electronic device 218B and the secondary identifier from the second secondary device 222. Consequently, the next time the key 218B is used to obtain access to the vehicle 201, the apparatus 101 will instruct the seat system 207 to adjust the driver's seat to that new position.

In the present embodiment, the apparatus 101 is only able to store a user input vehicle setting if a secondary identifier is received from a secondary device (such as the portable device 221, 222 or 223) that is associated with a primary identifier that was received from a primary device (such as the primary electronic device 218A, 218B) that was used to gain access to the vehicle. Consequently, if a user 211, 212 lends their primary electronic device 218A, 218B to another person, the other person, for example a valet or parking attendant, may obtain access to the vehicle 201 and drive it. When the other person uses the primary electronic device 218A, 218B to gain access, the various properties of the vehicle corresponding to the stored settings of the vehicle 201 that are associated with the primary electronic device 218A, 218B will be adjusted in response to instructions from the apparatus 101. In addition, the person who has borrowed the primary electronic device 218A, 218B may adjust settings of the vehicle 201 from those stored by the apparatus 101. For example, that person may adjust the positions of the seat, mirrors and steering wheel, and change radio channels and volume control on the infotainment system 210. However, the apparatus 101 will not store the settings unless an associated secondary device (e.g. the first secondary device 221 or the third secondary device 223 for the first primary electronic device 218A, or the second secondary device 222 for the second primary electronic device 218B) is present. Consequently, after lending the second primary electronic device 218B to another person, when the second user 212 next uses the second primary electronic device 218B to unlock the vehicle 201, the apparatus 101 will instruct the systems 203 to 210 to adjust the settings to those that were stored for the second user 212 and not those selected by the person who last borrowed the second primary electronic device 218B.

Furthermore, if instead of using the first primary electronic device 218A, the first user 211 used the second primary electronic device 218B belonging to the second user 212, she would be able to adjust settings in the vehicle 201. However, unless she was in possession of the second secondary device 222 that is associated with the second primary electronic device 218B, the adjustments made to the settings would not be stored because her secondary devices 221 and 223 are not associated with the second primary electronic device 218B.

The apparatus 101 is also connected to a user interface system 224 of the vehicle 201 that has a display for displaying information to a user and input means for receiving user inputs. In an example, the user interface system 224 comprises a touch screen configured to enable user input. The user interface system 224 may be a part of the infotainment system 210.

The user interface system 224 enables a user to provide the apparatus 101 with information that enables the apparatus to associate a secondary device, such as the secondary devices 221, 222 and 223, with a primary electronic device, such as keys 218A and 218B, that may be used to unlock the vehicle 201. In addition, the user interface device 224 may provide a user 211, 212 with means, such as a displayed keyboard, to enter their name, so that their personal identity can be stored and associated with a primary electronic device, such as keys 218A and 218B, and/or a secondary device, such as secondary devices 221, 222 and 223. For example, after receiving a name of a user, the user interface system 224 may be arranged to request the user to select a primary electronic device, such as key 218A, that has been detected by the access control system 214 as being present in the vehicle 201. Alternatively the user interface system 224 may be arranged to request the user to press a button on their key to identify that key as the one that should be registered as associated with the user.

In one example, several different secondary devices, such as mobile phones, may be associated with each primary electronic device that is registered by the apparatus 101. Thus, after entering the vehicle 201 using a primary electronic device, such as keys 218A, 218B, the apparatus 101 may be arranged to scan for secondary devices. For example, it may scan for Bluetooth® enabled devices and then cause the user interface system 224 to display details of the detected devices along with an invitation to the user to select one or more of the detected devices that are to be paired with the apparatus 101. Selected devices may then be paired with the apparatus 101 using conventional processes.

It will now be understood that the apparatus 101 provides a means of automatically saving settings of the vehicle 201. However, there may be circumstances in which the owner of a primary electronic device 218A, 218B may be present in the vehicle 201 and does not want the vehicle 201 to save the settings. For example, the owner 212 of the key 218B may be in the vehicle 201 as a passenger, while another person drives the vehicle 201 and changes the settings. For this reason, the user interface system 224 may be configured to receive a manual input indicating that the automatic saving of settings should not be performed, and to provide an override signal to the apparatus 101 if such a manual input is received. Additionally or alternatively, the apparatus 101 or the vehicle 201, in which the apparatus 101 is fitted, determines which vehicle door the key 218A, 218B was used to open, (as is often the case that each vehicle door has an antenna for communication with the key), and uses this information to determine whether the key used to unlock the vehicle 201 was carried by the driver or a passenger. In this way, the apparatus 101 may retrieve stored user input vehicle settings only if the key used to unlock the vehicle door was carried into the vehicle through the driver's door, as this is a strong indication that the driver and the owner of the key are one and the same. If the key used to unlock the vehicle, entered the vehicle 201 via a door other than the driver's door, automatic saving of settings will only be performed once the driver manually confirms, via the interface system 224, that the automatic override can be cancelled.

Figure 3:
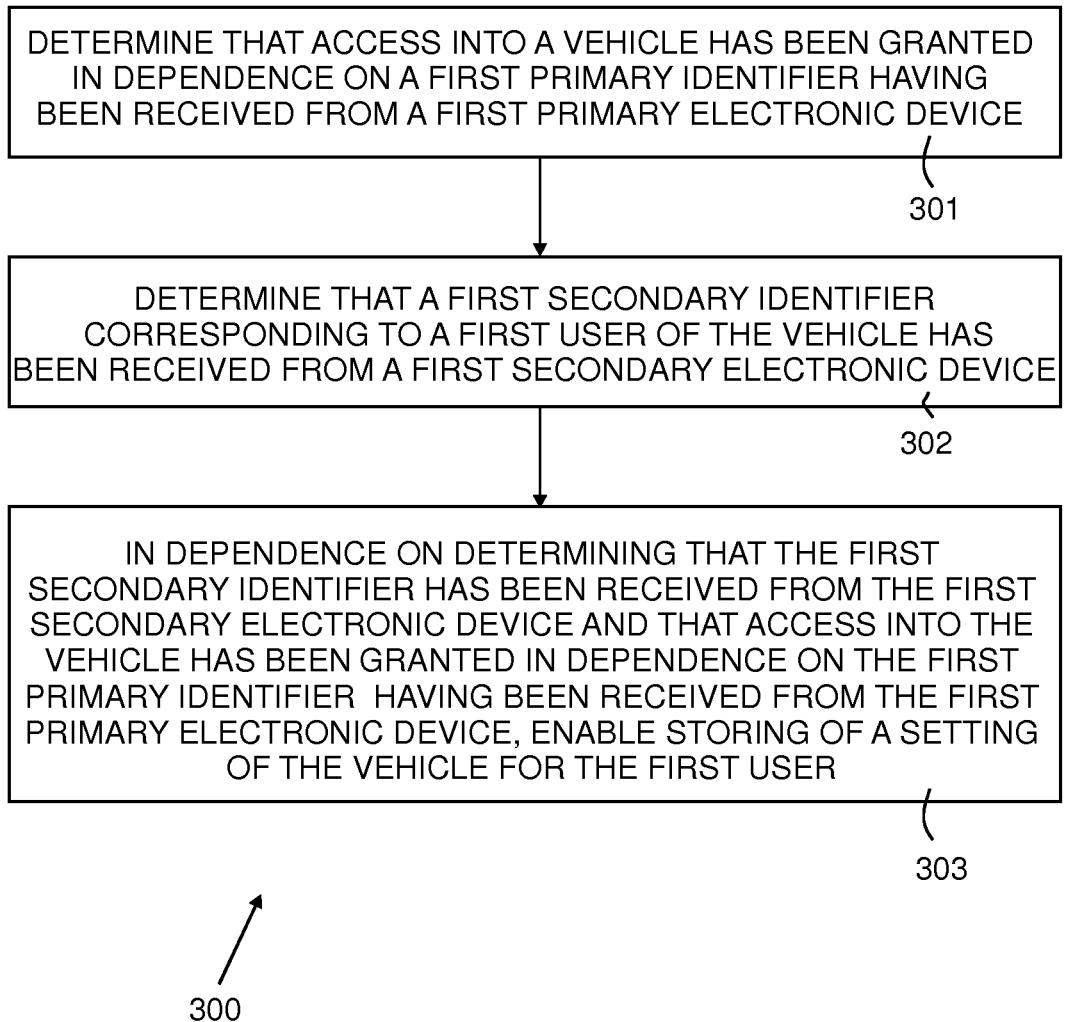
FIG. 3 shows a flowchart that illustrates a method 300 performable by the apparatus 101.

A method 300 that may be performed by the apparatus 101 is shown in the flowchart of FIG. 3. At block 301, it is determined that access into a vehicle 201 has been granted in dependence on a first primary identifier having been received from a first primary electronic device. Thus, for example, the first primary identifier may comprise a passcode obtained from a signal received from a first primary electronic device such as key 218A or 218B or from a biometric sensing device 216 that is located on the vehicle 201.

At block 302, the method 300 determines that a first secondary identifier corresponding to a first user of the vehicle 201 has been received from a first secondary electronic device, such as devices 221, 222 or 223. For example, a first secondary identifier may comprise data identifying a first secondary electronic device, such as a mobile phone that is paired with the apparatus 101. Thus, at block 302 the method 300 may only need to identify the secondary electronic device or devices that are within range of a radio transceiver 219 or NFC reader 220.

At block 303, in dependence on determining that the first secondary identifier has been received from the first secondary electronic device 221, 222 or 223 and that access into the vehicle 201 has been granted in dependence on the first primary identifier having been received from the first primary electronic device 218A, 218B, storing of a setting of the vehicle 201 for the first user is enabled. Therefore, any user input vehicle settings that have been made or adjusted are stored and associated with the first user, to allow the settings to be retrieved and used to set properties of the vehicle when the first user next uses the vehicle.

Figure 4:
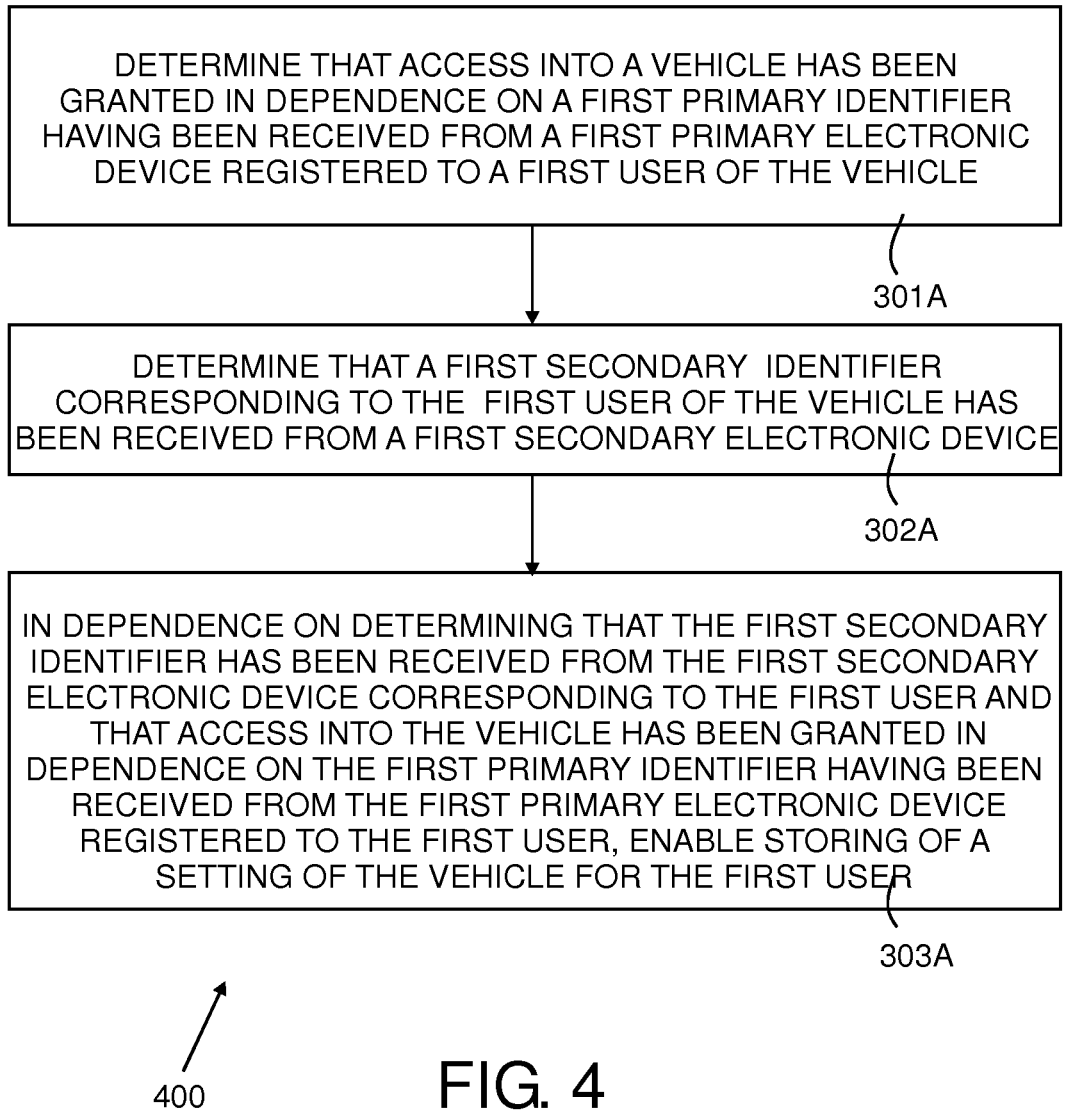
FIG. 4 shows a flowchart that illustrates a method 400 which provides a more specific example of the method 300.

An example of the method 300 is provided by a more specific method 400 that is outlined by the flowchart shown in FIG. 4. At block 301A, it is determined that access into a vehicle 201 has been granted in dependence on a first primary identifier having been received from a first primary electronic device, such as key 218A, that is registered to a first user, such as the first user 211, of the vehicle.

At block 302A, the method 400 determines that a secondary identifier corresponding to the first user 211 of the vehicle 201 has been received from a secondary electronic device 221, 223. Therefore block 302A of method 400 is similar to block 301 of method 300, but at block 302A it specifically requires that the secondary identifier is received from the same user (the "first user") that the first identifier was received from.

At block 303A, in dependence on determining that the secondary identifier has been received from the secondary electronic device 221, 223 corresponding to the first user and that access into the vehicle 201 has been granted in dependence on the primary identifier having been received from the first primary electronic device, such as key 218A, that is registered to the first user, storing of a setting of the vehicle 201 for the first user is enabled.

Therefore block 303A is like block 303 but storing is only enabled when the primary identifier and the secondary identifier correspond to same user (the "first user"). Because the first primary electronic device is registered as corresponding to the first user, this provides the advantage that, when the first user next uses the first primary electronic device to gain access to the vehicle 201, the apparatus 101 can immediately retrieve settings of the vehicle 201 for the first user. This can be done even before the presence of secondary electronic devices 221, 223 is determined, and can be done even if secondary electronic devices are not present. i.e., a user only needs the primary electronic device 218A to unlock the vehicle 201 and cause the apparatus 101 to adjust properties of the vehicle to the stored settings.

It will be appreciated that a combination of methods 300 and 400 may be used, with user input vehicle settings for systems such as HVAC being handled using method 300, whilst user input vehicle settings for systems such as mirror, steering wheel, steering column and seat adjustment settings being handled using method 400, as the latter group of settings often take longer to adjust due to the nature of their adjustment mechanisms. This may be particularly useful where, for example, the previous driver was much taller or shorter than the current user and so the seat, mirrors, steering column and steering wheel may all need significant adjustment before the current user can comfortably operate the vehicle 201. Adopting method 400 for these settings affords more time for the adjustments to be made before the user enters the vehicle.

Figure 5:
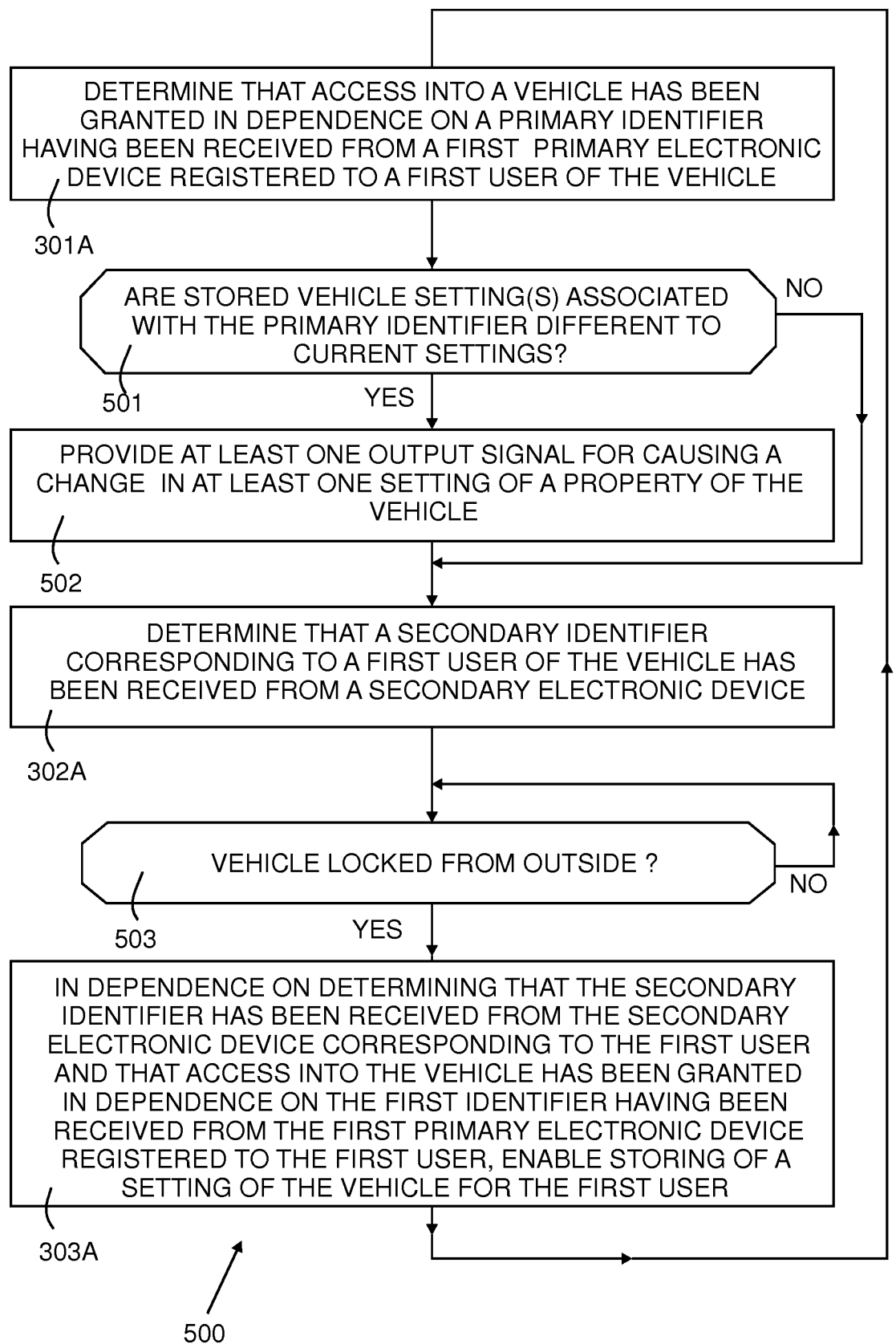
FIG. 5 shows a flowchart that illustrates a method 500 which provides a more specific example of the method 400.

An example of the method 400 is provided by a more specific method 500 that is outlined by the flowchart shown in FIG. 5. The method 500 comprises at block 301A determining that access into a vehicle 201 has been granted in dependence on a first primary identifier having been received from a first primary electronic device, such as key 218A, registered to a first user of the vehicle 201. Thus, block 301A of method 500 is the same as block 301A of method 400 described above. However, it will be appreciated that block 301A of method 500 could be replaced, in an alternative embodiment, by block 301 of method 300.

At block 501 it is determined whether one or more of stored user input vehicle setting(s) associated with the primary identifier are different to the current settings of the vehicle 201. For example, it is determined if the stored setting for the position of the driver's seat is different to the actual current position of the driver's seat. If there are any differences identified at block 501, at least one output signal is provided at block 502 to cause a change in at least one setting of the vehicle 201, in order to cause the actual settings of the vehicle to match the stored settings.

At block 302A, the method 500 determines that a secondary identifier corresponding to the first user of the vehicle 210 has been received from a secondary electronic device, such as devices 221, 223. Therefore block 302A of method 500 is the same as block 302A of method 300 described above. However, it will be appreciated that block 302A of method 500 could be replaced, in an alternative embodiment, by block 302 of method 300.

At block 503 the method determines whether the vehicle 201 has been locked from outside the vehicle, indicating that the user has left the vehicle. When it is determined that the vehicle 201 has been locked from the outside, the process of block 303A is performed. At block 303A, in dependence on determining that the secondary identifier has been received from the secondary electronic device, 221, 223, and that access into the vehicle 201 has been granted in dependence on the first primary identifier having been received from the first primary electronic device 218A that is registered to the first user, storing of a setting of the vehicle 201 for the first user is enabled. Therefore block 303A of method 500 is the same as block 303A of method 400 described above. However, it will be appreciated that block 303A of method 500 could be replaced, in an alternative embodiment, by block 303 of method 300.

Figure 6:
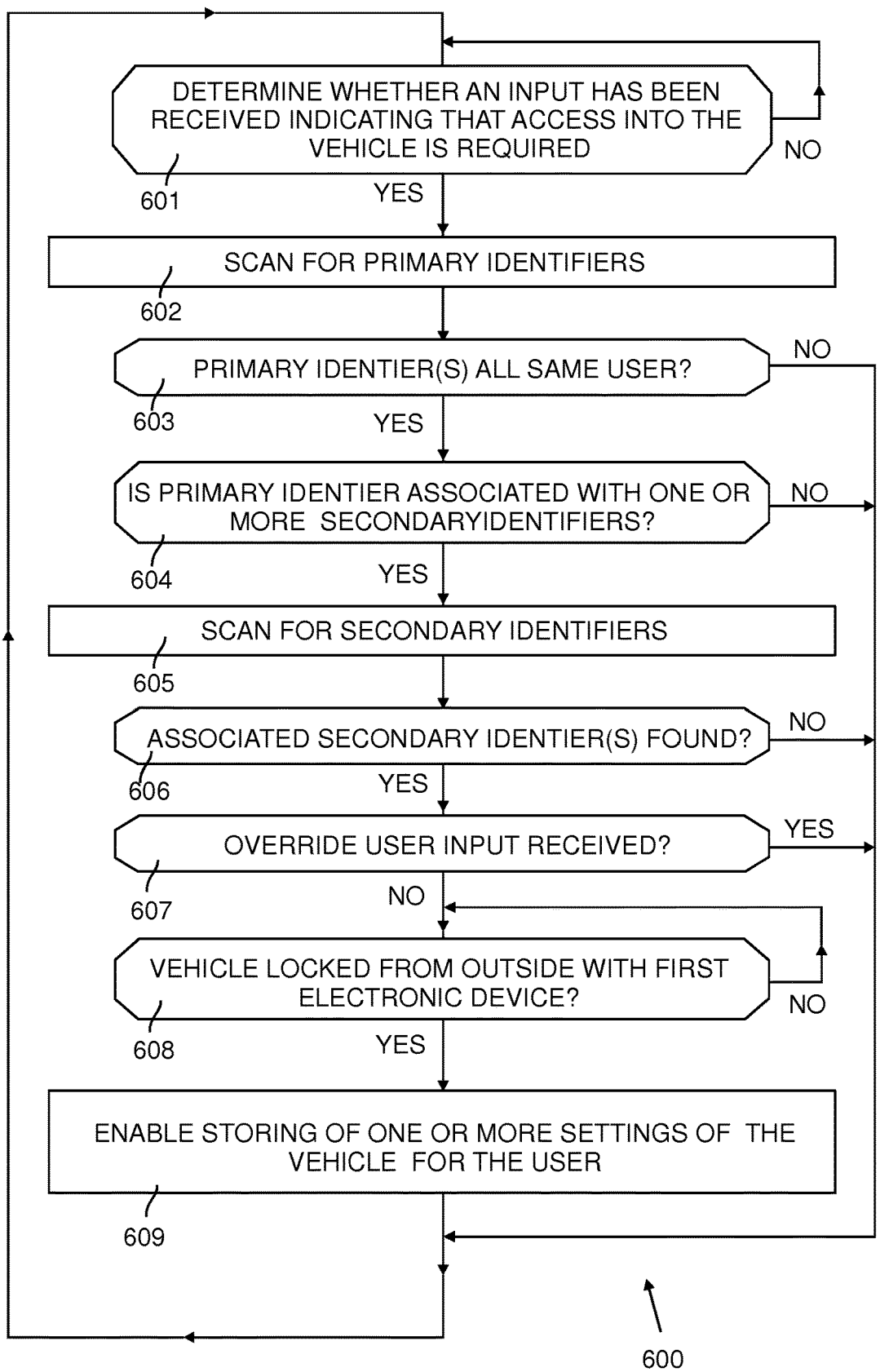
FIG. 6 shows a flowchart that illustrates a method 600 which provides a more specific example of the method 400.

An example of the method 400 is provided by a more specific method 600 that is outlined by a flowchart shown in FIG. 6. The method 600 comprises at block 601 determining whether an input signal has been received which indicates that access into a vehicle 201 is required. The input signal may be produced by an access control system 214 in response to a user actuation of a button or door handle 217, or it may be produced in response to a signal received at a sensing device 216 of the access control system 214, for example when a user has actuated a button on their primary electronic device 218A, 218B to unlock the vehicle 201.

When it is determined that an input signal has been received at block 601, indicating that access into a vehicle 201 is requested, a scan is performed for primary identifiers at block 602. For example, the process at block 602 may comprise: providing a radio signal from the transceivers 216 of the access control system 214 to request a response from primary electronic devices, such as keys 218A and 218B, that may be within range; and then awaiting radio responses from the primary electronic devices for a defined period of time. At block 603 it is determined whether all primary identifiers received at block 602 are registered to the same user and, if they are, then the process at block 604 is performed.

At block 604 it is determined whether the one or more primary identifiers received at block 602 are associated with one or more secondary devices, such as 221, 222 or 223. For example, the processor 103 of apparatus 101 may access the memory 104 to retrieve the identity of any secondary devices, such as devices 221, 222 or 223, that have been registered as associated with the primary electronic devices from which the primary identifiers have been received. If, at block 604, any secondary devices are found to be associated with the received primary identifiers, a scan for secondary identifiers is performed at block 605. For example, the apparatus 101 may scan for secondary electronic devices, such as devices 221, 222 and 223, with which it has been paired or scan for portable devices to determine which devices are on the same WLAN network.

At block 606 the method 600 determines whether any secondary identifiers were found in the scan at block 605 and, if so, block 607 is performed. At block 607, it is determined whether a user input has been received which indicates that the user does not want any changes to the settings of the vehicle to be automatically saved. That is, it is determined if an override input signal has been received, for example, via the user interface system 224. If no such signal is received, then the method continues to block 608, in which it monitors whether the vehicle 201 has been locked from the outside and which would indicate that the user has left the vehicle.

When it is determined at block 608 that the vehicle 201 has been locked from the outside, one or more settings of the vehicle are stored for the user at block 609. Those stored settings may then be used to adjust the properties of the vehicle when the same primary electronic device is next used to unlock the vehicle.

Figure 7:
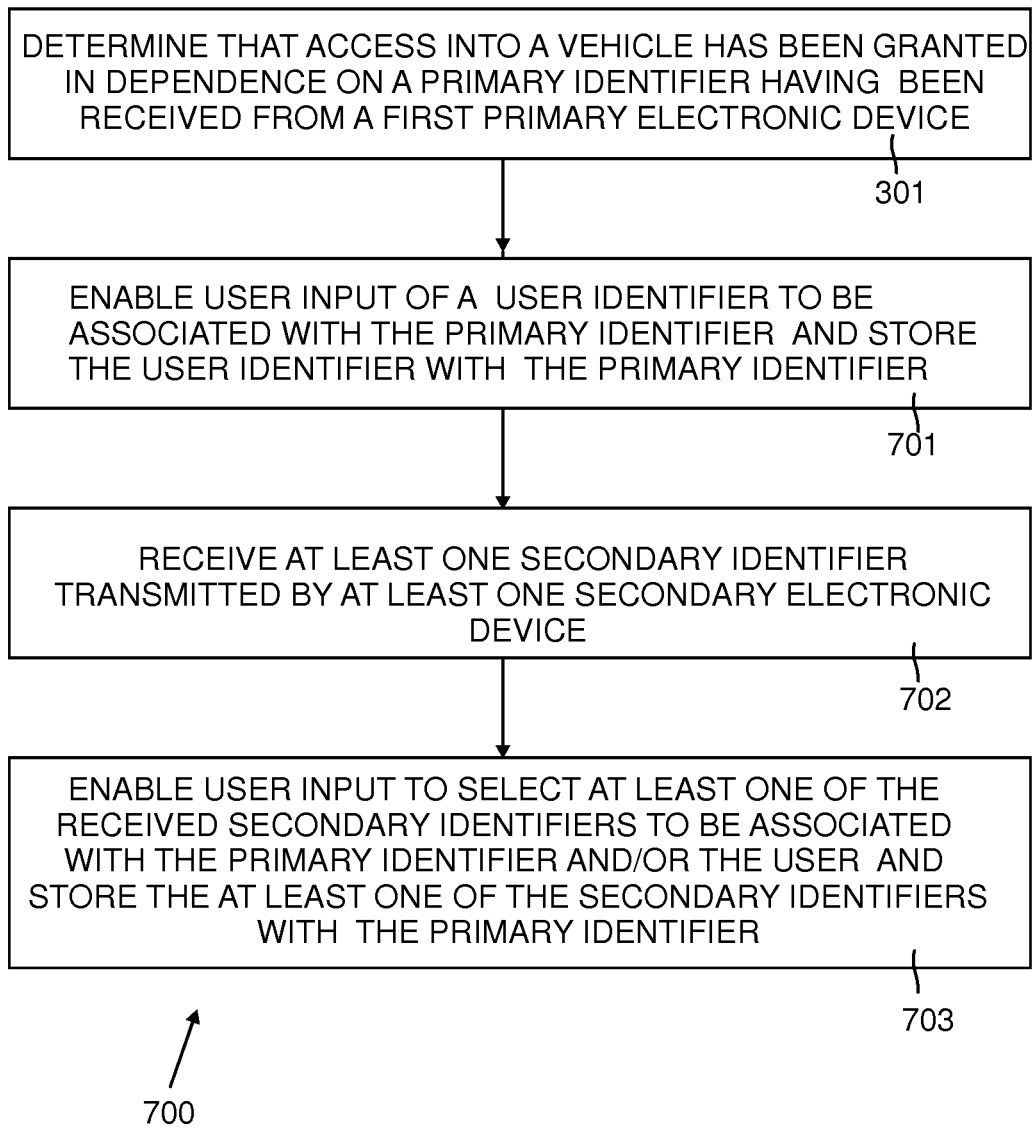
FIG. 7 shows a flowchart that illustrates a method 700 of registering a primary electronic device and/or a secondary electronic device.

A method 700 of registering a primary electronic device, such as keys 218A and 218B, and/or a secondary electronic device, such as portable secondary devices 221, 222 and 223, is outlined by a flowchart shown in FIG. 7. At block 301 the method 700 determines that access into a vehicle 201 has been granted in dependence on a primary identifier having been received from a primary electronic device, such as a key 218A or 218B. Therefore block 301 of method 700 comprises the same process as block 301 of method 300.

At block 701, the method 700 enables a user input of a user identifier to be associated with the primary identifier and stores the user identifier with the primary identifier. For example, a user is provided with means to enter their name using the user interface system 224, and their name is then stored along with the primary identifier that was used to unlock the vehicle.

At block 702, at least one secondary identifier transmitted by at least one secondary electronic device is received. This may be achieved, for example, by scanning for Bluetooth® enabled devices or determining what devices are logged on to a WLAN network.

At block 703 the method 700 enables a user input to select at least one of the received secondary identifiers, for example by displaying details of the secondary devices 221, 222, 223 on the display of the user interface system 224 and inviting a user input. The receipt of a user input causes the selected secondary identifier(s) to be associated with the primary identifier that was used to access the vehicle at block 301, and/or causes the selected secondary identifier(s) to be associated with the user identifier that was input at block 701. The one or more associations are then stored.

For purposes of this disclosure, it is to be understood that the controller(s) or control means described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor (s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in the FIGS. 3 to 7 may represent steps in a method and/or sections of code in the computer program 105. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, only two primary electronic devices, i.e. keys 218A and 218B, and three secondary electronic devices 221, 222 and 223 were described in reference to the example of FIG. 2 but arrangements comprising more than two keys and more than three secondary electronic devices are envisaged. Also, embodiments are envisaged in which a user has several primary electronic devices and several different secondary electronic devices. In some embodiments the apparatus 101 associates each of the different secondary electronic devices with each of the primary electronic devices so that any combination of primary and secondary electronic devices may be used by a driver to cause the apparatus to save his or her settings.

The described methods were described as being performable on a single apparatus 101, but at least some of the described processes may be performed on other devices in alternative examples. In addition, the apparatus 101 may be configured to perform other functions in addition to the methods described above.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for enabling storing a user input vehicle setting, the apparatus comprising a processor and a memory for storing at least one user input vehicle setting, wherein the apparatus is configured to:
   determine access into a vehicle has been granted in based on receipt of a primary identifier from a primary electronic device;
   determine the identity of a user based on receipt of a secondary identifier from a secondary electronic device;
   provide an output signal for causing a change in a vehicle setting of a property of the vehicle, the output signal being provided in response to said determining that access into the vehicle has been granted, the output signal being provided regardless of whether the secondary identifier has been received; and
   enable storing in the memory the user input vehicle setting associated with the determined identity of the user, and corresponding to the output signal, and any other user input vehicle settings made during a journey only when the secondary identifier associated with the primary identifier has been received.

2. An apparatus according to claim 1, wherein the apparatus is further configured to:
   store data to register the primary electronic device as being associated to either or both of the secondary electronic device and the identity of the user; and
   enable the storing of the user input vehicle setting only when the secondary identifier is received from the secondary device that is registered as being associated to the primary electronic device.

3. An apparatus according to claim 1, wherein the apparatus is further configured to:
determine that, based on a second primary identifier having been received from a second primary electronic device, access into the vehicle has been granted;
determine the identity of a second user based on receipt of a second secondary identifier from a second secondary electronic device; and
enable storing a user input vehicle setting associated with the second user in the memory.

4. An apparatus according to claim 1, wherein the apparatus is further configured to:
store the secondary identifier associating the secondary electronic device to the user;
store a third identifier associating a third electronic device to the user; and
enable storing of a user input vehicle setting in the memory for said user based on determining that the secondary identifier has been received from the secondary electronic device or determining that the third identifier has been received from the third electronic device.

5. An apparatus according to claim 1, wherein the user input vehicle setting comprises at least one selected from a group consisting of: a seat position; a mirror position; an HVAC setting; a driving aid setting; an entertainment or infotainment system setting; a suspension setting; a brake setting; and a powertrain setting.

6. An apparatus according to claim 1, wherein the apparatus is further configured to:
receive an override signal; and
on receipt of receiving an override signal, prevent storing of any user input vehicle in the memory.

7. An apparatus according to claim 1, wherein the apparatus is further configured to:
based on the primary identifier being received from the primary electronic device, retrieve stored information from the memory identifying the secondary electronic device; and
perform a scan for the secondary electronic device.

8. An apparatus according to claim 1, wherein the apparatus is further configured to: enable the storing of user input vehicle setting based on a determination that the vehicle has been locked from outside of the vehicle.

9. A system comprising the apparatus of claim 1, and a radio signal receiver configured to:
either or both receive a radio signal comprising the primary identifier from the primary electronic device and receive a radio signal comprising the secondary identifier from the secondary electronic device; and
provide a corresponding indication to the apparatus in response to receiving the primary identifier or the secondary identifier.

10. A system according to claim 9, wherein the radio signal receiver comprises at least one selected from a group consisting of: a Bluetooth® transceiver; a wireless local area network (wireless LAN) transceiver; and a radio frequency identification (RFID) reader.

11. A system according to claim 9 comprising a primary electronic device and wherein the primary electronic device comprises a portable key configured to communicate with the radio signal receiver.

12. A system according to claim 9, wherein the system further comprises the secondary electronic device, which is configured to perform at least one function independently from the vehicle.

13. A system according to claim 12, wherein at least one of the functions comprises either or both transmitting and receiving signals via a telecommunications network.

14. A vehicle comprising the apparatus of claim 1.

15. A method of enabling storing a user input vehicle setting, the method comprising:
determining that access into a vehicle has been granted based on a receipt of a primary identifier from a primary electronic device;
determining that a secondary identifier has been received from a secondary electronic device;
determining a user identity, based on the secondary identifier;
determining that a user input vehicle setting has been received;
providing an output signal for causing a change in a vehicle setting of a property of the vehicle, the output signal being provided in response to said determining that access into the vehicle has been granted, the output signal being provided regardless of whether the secondary identifier has been received; and
enabling storing of said user input vehicle setting associated with said user identity, and corresponding to the output signal, and any other user input vehicle settings made during a journey only when the secondary identifier associated with the primary identifier has been received.

16. A method according to claim 15, further comprising:
storing data to register the secondary electronic device as being associated to the first primary electronic device; and
enabling the storing of the user input vehicle setting only when the secondary identifier is received from the secondary device registered as being associated to the primary electronic device.

17. A tangible, non-transitory computer-readable storage medium containing instructions which when executed on a processor cause the processor to perform the method of claim 15.

* * * * *